Sept. 18, 1928.
W. T. SUTHERLAND
TIRE COVER
Filed Sept. 10, 1926 2 Sheets-Sheet 1
1,684,420
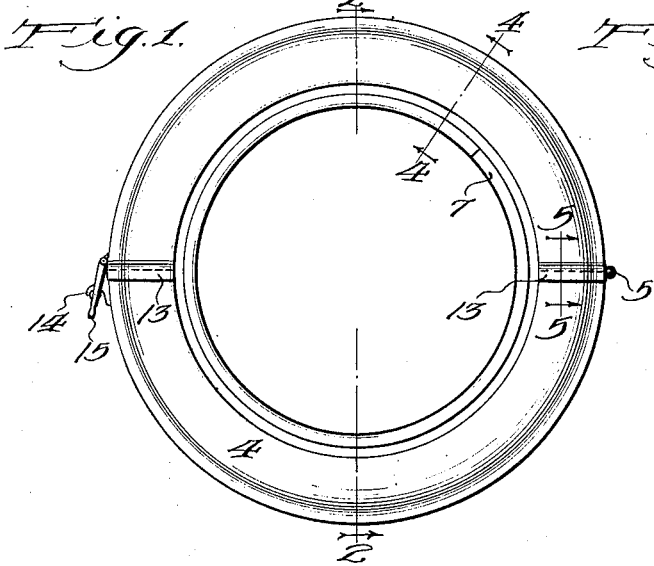
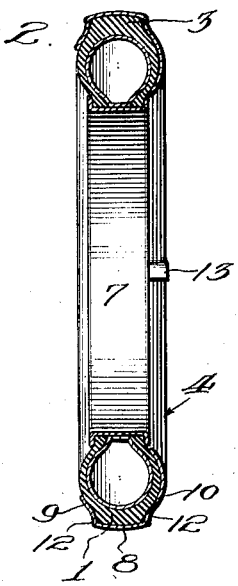
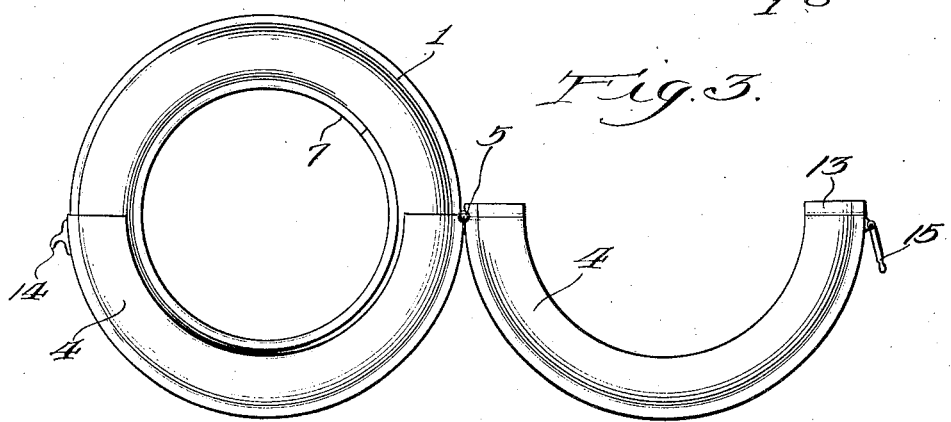
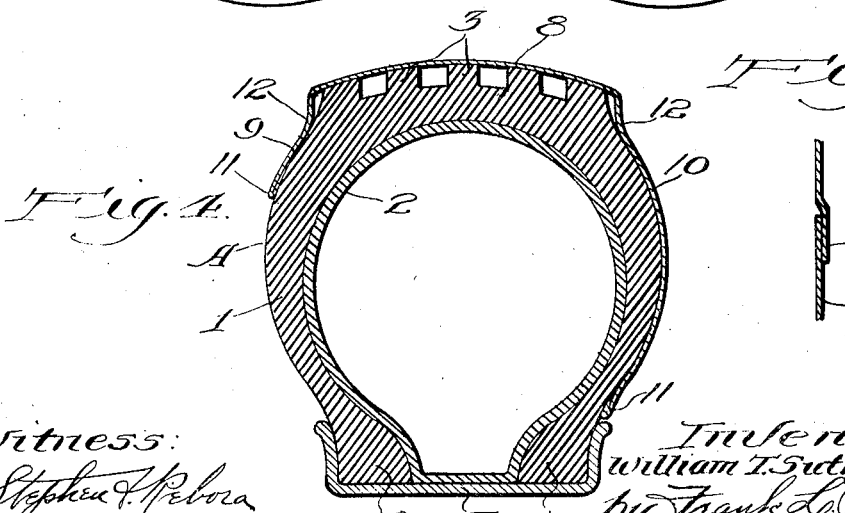
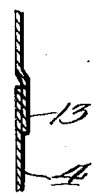
Witness:
Stephen F. Pelora
Inventor:
William T. Sutherland
by Frank L. Belknap
Atty.

Sept. 18, 1928.                    1,684,420
W. T. SUTHERLAND
TIRE COVER
Filed Sept. 10, 1926         2 Sheets-Sheet 2
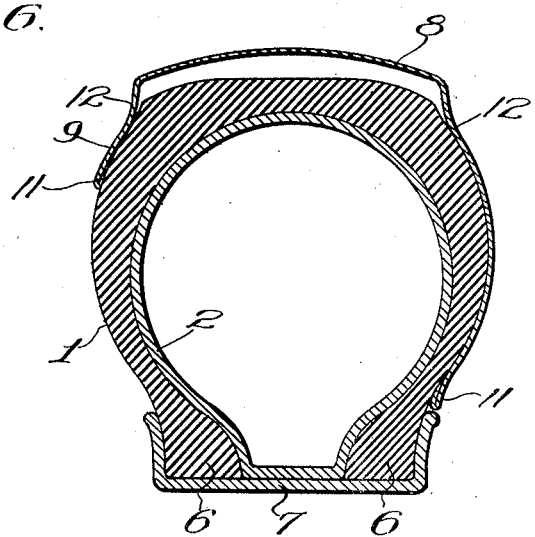
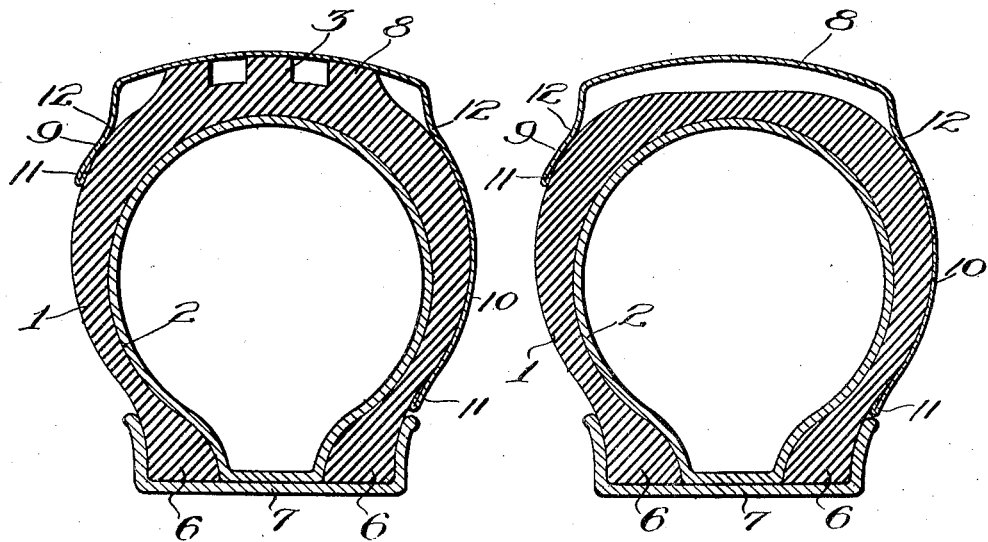

Patented Sept. 18, 1928.

1,684,420

UNITED STATES PATENT OFFICE.

WILLIAM T. SUTHERLAND, OF CHICAGO, ILLINOIS.

TIRE COVER.

Application filed September 10, 1926. Serial No. 134,619.

The present improvements relate more particularly to a tire cover made of metal. Metal tire covers heretofore obtained, have been subject to many serious objections, among which may be cited wobbling and movement of the tire cover on the tire after the tire tread has begun to wear away. Another disadvantage has been the complicated construction and extremely high cost of metal tire covers as compared with flexible tire covers.

The present improvements have been carefully designed to overcome the many objections and disadvantages to the use of metal tire covers hereinbefore mentioned, and the invention contemplates an inexpansive metal tire cover comprising few parts, which is simple to assemble and disassemble, with a minimum of labor and loss of time. More specifically, the present invention comprises a piece of metal of substantial width shaped to conform to the circular contour of a tire and transversely divided into sections. The sections partake of the form of segmental arcs having pivotal connection with each other. The meeting ends of two predetermined sections are unhinged in order to permit pivotal movement of the hinged ends of said sections, and a locking of the sections into a compact unitary structure around the tire.

As a feature of the present invention in transverse cross section, each of the sections comprise a central crown-like portion, to one annular edge of which is connected a relatively short extension while to the other edge is connected a relatively wide extension. Both of the extensions are shaped to conform to the contour of the wall of the tire, the annular edge of the shorter extension terminating short of the point of greatest transverse width of the tire while the edge of the longer extension is in contact with the wall of the tire, and terminates at a point immediately adjacent the bead of the tire.

As another feature of the present invention, the walls of the extension immediately adjacent the annular edges of the crown are inwardly indented, that is, provided with an annular indentation in effect providing a shoulder to form annular contact between opposite walls of the extensions and opposite walls of the tire.

As an advantage of the present invention, the tire cover is prevented from wobbling or rattling on the tire regardless of the extent of wear on the tread of the tire, this advantage being accomplished by the contacting shoulders heretofore mentioned.

As another advantage of the present invention the longer extension is preferably applied to the wall of the tire, which when carried on an automobile would normally be exposed to the weather, thus protecting this side from weathering.

As another advantage of the present invention, one side wall of the tire projects beyond the annular edge of the short extension, thus permitting the tire to be laid on a flat surface on that wall to permit of the assembly of the tire cover of the present invention around the tire and remove it from the tire without the necessity of moving the tire to different positions while said installation or removal is taking place.

The contact between the tire cover of the present invention and the tire, provides a snug fit, thus providing a seal against the entrance of water and dirt.

I am aware that heretofore metal tire covers have been provided, which comprise transversely divided sections, but I believe that I am the first to provide a metal tire cover composed of transversely divided sections so connected as to permit pivotal movement between the sections and also I believe that I am the first to shape such a section so that it has a short annular extension and a wide annular extension from opposite annular edges of an intermediate crown-like portion for the purposes described.

In the drawings, Fig. 1 is a side elevational view of the tire cover of the present invention in place on a tire.

Fig. 2 is a cross sectional view taken on line 2—2 of Fig. 1. Fig. 3 is a view similar to Fig. 1, illustrating the pivotal movement of one section relative the other section, to expose the tire.

Fig. 4 is a cross sectional view taken through line 4—4 of Fig. 1.

Fig. 5 is a cross sectional view taken on line 5—5 of Fig. 1.

Fig. 6 is a view similar to Fig. 4 illustrating a worn tread. Fig. 7 is a view similar to Fig. 4 illustrating a tread of narrow width.

Fig. 8 is a view of Fig. 7 illustrating a worn tread.

Referring more in detail to the drawings, 1 designates a tire of the pneumatic type adapted to be provided with an inner tube 2. The side walls of such a tire are generally curved conforming substantially to the arc of a circle. Such tires are generally provided with treads. There are numerous sizes of these tires on the market, such sizes being based on the width between opposite sides of the tire casing, and on the cross sectional width of the casing. These sizes have become standard and are well known. However, the width of the treads for each standard size may vary as much as one and a half to two inches, depending on the manufacture.

I have attempted to illustrate this in the drawings and in Fig. 4, the numeral 3 designates a tread of the maximum width, for instance, 4½ inches. In experimenting with metal tire covers, it was found that some means must be provided to prevent rattling and wobbling of the tire within the metal tire casing when the tread has begun to wear, and also a metal tire cover must be provided which would fit standard dimension tires, regardless of the width of the tread.

These objects are effective in the present invention in a very efficient manner. The tire casing of the present invention comprises connected sections 4 of metal. These sections 4 are of the shape of a segmental arc to conform to the contour of a tire. There may be any number of sections but I have found that a preferable number is two sections of equal length. Adjacent sections may be connected by means of the hinge 5 or any other suitable means, which will permit pivotal movement of one section relative to the other.

Each tire is provided with the usual beads 6 which comprise enlarged annular edges of the tire adapted to form a clinching connection with the rim 7. Each section 4 comprises a curved body portion which in cross section exhibits a crown 8 of substantial with. A short extension 9 and a wide extension 10 are connected to opposite annular edges of the crown 8. Each of the extensions 9 and 10 may terminate in a flanged or beaded edge 11. The annular edge of the short extension 9 terminates short of the point of maximum cross sectional width of the tire, which may be designated A. The wider extension 10 projects beyond this point having an annular edge contacting the tire and preferably terminating at a point immediately adjacent the bead 6. Immediately adjacent the annular edges of the crown 8, each of the extensions 9 and 10 may be provided with annular indentations 12, which in effect form shoulders against which the wall of the tire immediately adjacent the tread will contact.

It will be immediately apparent to those skilled in the art that by this arrangement regardless of the wearing away of the tread, the inner surfaces opposite the indentations 12 will always be in contact with the tire to prevent rattling and wobbling of the tire within the casing. These two opposite surfaces in effect keep the tire in a rigid supported position. In addition, the annular edge 11 of the extension 10 assists in supporting this tire in this fixed rigid position, and prevents any substantial wobbling.

The tire covers of the present invention, it will be seen, utilize a minimum amount of material, resulting in economy in manufacture without in any way sacrificing any of the qualities necessary for an efficient metal tire cover.

As a feature of the invention where one section contacts another I provide aprons or flaps 13 bent slightly outwardly to telescope the adjacent edge of a section. As another feature of the present invention, one end of the section 4 may be provided with a locking lug 14 adapted to engage a drawbolt 15. Of course I do not wish to limit myself to any particular locking means, but it may be pointed out that it is desirable to provide a lock similar to a drawbolt in order to permit a gripping purchase and leverage to draw the sections together.

By reference to Figs. 6, 7 and 8, it will be seen that regardless of the wearing away of the tread or the width of the tread, that the walls of the extensions 9 and 10 will make contact with the opposite walls of the tire cover to prevent any accidental movement or wobbling.

It is to be understood that various changes may be made in the mechanical application of the principles of the invention without departing from the scope of the invention.

I claim as my invention:

1. A tire cover comprising a circular metal element transversely divided into sections of a segmental arc shape and pivotal hinges connecting the sections, each section in transverse cross section presenting an intermediate crown-like portion, and annular extensions from each edge curved to contact the curved side walls of the tire, the annular edge of one extension terminating in contact with the tire wall short of the point of widest transverse sectional width of the tire, the other extension being of greater width, the annular edge of which latter terminates in contact with the tire wall immediately adjacent the bead thereof.

2. A tire cover comprising a circular metal element transversely divided into sections of a segmental arc shape and pivotal hinges connecting the sections, each section in transverse cross section presenting an intermediate crown-like portion, and annular extensions from each edge curved to contact the curved side walls of the tire, the annular edge of one extension terminating in contact with the tire wall short of the point of widest transverse sectional width of the tire, the other extension being of greater width, the annular edge of which latter terminates in contact with the tire wall immediately adjacent the bead thereof, and the latter extension also contacting the tire at a point substantially opposite to the point of contact with the tire of said first mentioned extension.

3. A tire cover comprising a circular metal element transversely divided into sections of a segmental arc shape and pivotal hinges connecting the sections, each section in transverse cross section presenting an intermediate crown-like portion, and annular extensions from each edge curved to contact the curved side walls of the tire, the annular edge of one extension terminating in contact with the tire wall short of the point of widest transverse sectional width of the tire, the other extension being of greater width, the annular edge of which latter terminates in contact with the tire wall immediately adjacent the bead thereof, each extension being provided with annular indented portions immediately adjacent the annular edges of the crown whereby the opposite inner surfaces of the extensions will contact the tire wall.

4. A tire cover comprising a circular metal element transversely divided into sections of a segmental arc shape and pivotal hinges connecting the sections, each section in transverse cross section presenting an intermediate crown-like portion, and annular extensions from each edge curved to contact the curved side walls of the tire, the annular edge of one extension terminating in contact with the tire wall short of the point of widest transverse sectional width of the tire, the other extension being of greater width, the annular edge of which latter terminates in contact with the tire wall immediately adjacent the bead thereof, one side wall of the tire at the point of greatest transverse width projecting beyond the annular edge of said short extension, thus lying in a plane outside the plane of said edge.

5. In combination with a tire having a tread and enlarged beads on opposite annular edges, of a cover therefor comprising a circular metal element made up of transversely divided connected sections of a segmental arc shape hinged for pivotal movement relative each other, each section in transverse section presenting a central crown-like portion of a width equal to or greater than the width of the tire tread, a short extension from one annular edge of the crown-like portion, and a relatively longer extension from the other edge, the edge of the short extension terminating short of the point of greatest transverse width of the tire, the edge of the long extension contacting the tire and terminating adjacent a beaded edge, each of said extensions being provided with annular indented portions forming tire contacting areas.

6. In combination with a tire having a tread and enlarged beads on opposite annular edges, of a cover therefor comprising a circular metal element made up of transversely divided connected sections of a segmental arc shape hinged for pivotal movement relative each other, each section in transverse section presenting a central crown-like portion of a width equal to or greater than the width of the tire tread, a short extension from one annular edge of the crown-like portion, and a relatively longer extension from the other edge, the edge of the short extension terminating short of the point of greatest transverse width of the tire, so that the tire wall projects beyond the plane of said edge, the edge of the long extension contacting the tire and terminating adjacent a beaded edge, each of said extensions being provided with annular indented portions forming tire contacting areas.

WILLIAM T. SUTHERLAND.